(12) United States Patent
Hahnlen et al.

(10) Patent No.: US 11,813,656 B2
(45) Date of Patent: Nov. 14, 2023

(54) LOW MELTING TEMPERATURE METAL FILL FOR ADDITIVELY MANUFACTURED TOOLS

(71) Applicant: Honda Motor Co., Ltd., Tokyo (JP)

(72) Inventors: Ryan M. Hahnlen, Dublin, OH (US); Benjamin Adam Hoffman, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 549 days.

(21) Appl. No.: 16/905,140

(22) Filed: Jun. 18, 2020

(65) Prior Publication Data
US 2021/0086251 A1   Mar. 25, 2021

Related U.S. Application Data

(60) Provisional application No. 62/905,855, filed on Sep. 25, 2019.

(51) Int. Cl.
| | | |
|---|---|---|
| *B21D 37/20* | (2006.01) | |
| *B33Y 70/10* | (2020.01) | |
| *B33Y 80/00* | (2015.01) | |

(52) U.S. Cl.
CPC .............. *B21D 37/20* (2013.01); *B33Y 70/10* (2020.01); *B33Y 80/00* (2014.12)

(58) Field of Classification Search
CPC .................................................. B29C 33/565
See application file for complete search history.

(56) References Cited

U.S. PATENT DOCUMENTS

| | | | | |
|---|---|---|---|---|
| 3,723,585 | A * | 3/1973 | Nussbaum | B29C 33/565 264/46.7 |
| 5,260,014 | A * | 11/1993 | Holton | B29C 33/04 264/572 |
| 5,616,293 | A * | 4/1997 | Ashtiani-Zarandi | B29C 33/448 264/401 |
| 10,266,925 | B2 | 4/2019 | Thuo et al. | |
| 2010/0314794 | A1 * | 12/2010 | Dietrich | B29C 70/30 700/98 |
| 2016/0039006 | A1 | 2/2016 | Amstutz et al. | |

FOREIGN PATENT DOCUMENTS

| | | |
|---|---|---|
| CN | 106132654 | 11/2016 |
| CN | 106956001 | 7/2017 |
| CN | 107755697 | 3/2018 |
| CN | 108326309 | 7/2018 |
| CN | 208214333 | 12/2018 |
| WO | 2018010531 | 1/2018 |

* cited by examiner

*Primary Examiner* — Christopher T Schatz
(74) *Attorney, Agent, or Firm* — RANKIN, HILL & CLARK LLP

(57) ABSTRACT

A forming tool including an additive manufactured polymer shell defining a first side and an opposite second side. The forming tool includes a support structure mechanically connected to the second side of the shell. The support structure may be formed by pouring a molten backfill material into the shell, and solidifying the backfill material. The backfill material includes a low melting temperature metal, fusible alloy, or other element. The solidified backfill material has a strength and rigidity greater than the polymer used to make the shell. The first surface of the shell includes a complex surface for bringing into contact with a material in a stamping process to form a stamped part.

17 Claims, 4 Drawing Sheets

LOW MELTING TEMPERATURE METAL FILL FOR ADDITIVELY MANUFACTURED TOOLS

BACKGROUND

Forming tools are commonly used in hydraulic, pneumatic, and mechanical presses modify sheet metal to form variously shaped components in large volumes. Current forming tools (e.g. die stamp tool, punch tool, cut-off tool, etc.) are made from tool steel for strength, durability, and stiffness considerations. Traditional steel tooling is made by CNC machining a large cast metal blank, which requires a significant amount of skilled labor, lead time, and material scrap. While tool steel is excellent for high-volume manufacturing, tools made in such a way for prototype tooling is just as expensive as the mass production tooling, despite not requiring the same level of durability.

BRIEF DESCRIPTION

According to one aspect, a forming tool for producing a stamped surface having a predetermined shape, includes an additive manufactured polymer shell defining a first side and a second side opposite from the first side. The tool includes a solid phase backfill material arranged at the second side of the polymer shell. The solid phase backfill material is mechanically connected to the second side of the polymer shell. The first side of the polymer shell includes a contoured surface having a first predetermined contour configured to produce the stamped surface in a material.

According to another aspect, a method of making a forming tool for use in a stamping machine to form a stamped part, includes additively manufacturing a polymer shell defining a first side and a second side opposite from the first side. The first side of the polymer shell is configured to contact a material to form the stamped part. A molten backfill material is arranged at the second side of the polymer shell. The molten backfill material is solidified to thereby form a solid phase backfill material at the second side of the polymer shell.

According to another aspect, a method of method of making a forming tool includes forming a polymer shell by additive manufacturing. The polymer shell defines a first side and a second side opposite from the first side. The first side of the polymer shell is configured to contact a material to form a stamped part. The method further includes forming a support structure for the polymer shell, and arranging the support structure at the second side of the polymer shell.

According to another aspect, a method of forming stamped components includes providing a press having a forming tool. The forming tool includes an additive manufactured polymer shell defining a first side and a second side opposite from the first side. The first side includes a contoured surface having first predetermined contour. The tool includes a solid phase backfill material arranged at the second side of the polymer shell. The method includes bringing the first side of the polymer shell into contact with a surface of a material to provide a stamped surface to the material. The stamped surface has a second predetermined contour corresponding to the first predetermined contour.

DETAILED DESCRIPTION

Figure 1:
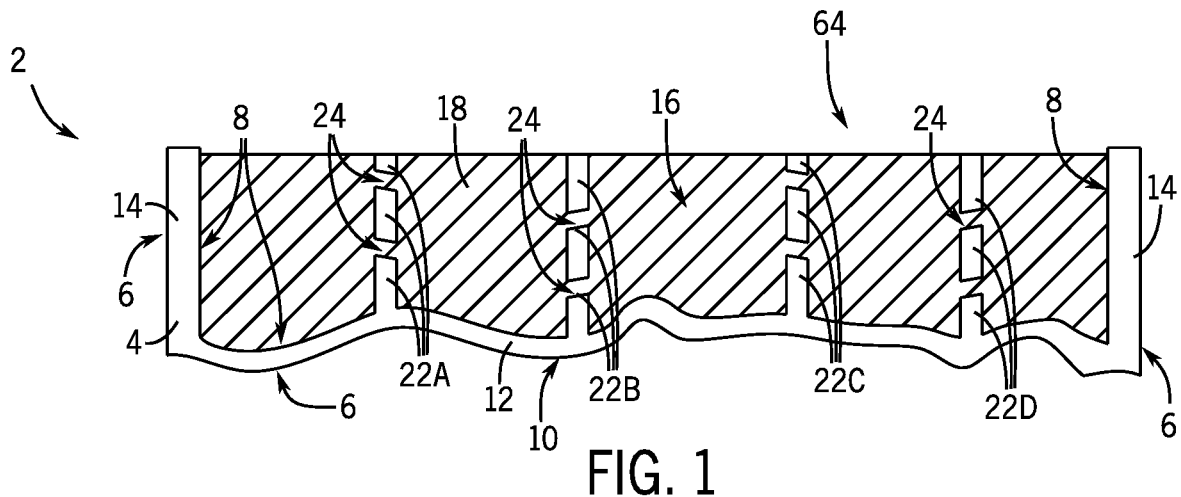
FIG. 1 is a cross-sectional view of a forming tool according to the present subject matter.

Additive manufacturing (AM), for example 3D printing, may be considered for producing forming tools to reduce the time to create a forming tool. Utilizing the additive manufacturing process can reduce the time and expense associated with machining conventional metal forming tools, and can reduce the volume of material waste, such as would typically be generated during CNC machining of metal forming tools.

However, even the use of AM machines may be relatively expensive, and access to them may be relatively limited, and so the production of AM parts can also be somewhat restricted. These problems may be compounded by the printing of the contoured surface of the tool, along with the self-supporting structure for that contoured surface.

The present subject matter relates to a forming tool produced in part by additive manufacturing. The forming tool may be used in a press operation to produce a stamped product from sheet metal. The forming tool may be a die for example, used in a die stamping process to form stamped parts, or may be another forming tool.

With reference to the figures, a forming tool 2 includes an AM shell 4 including a first side 6 and a second side 8 opposite from the first side 6. The first side 6 may include a contoured surface 10 used to contact a material (e.g. sheet metal) to alter a shape of the material and thereby form a stamped part. The shell may include a base 12, which includes the contoured surface 10, and sidewalls 14 extending from the base 12 to thereby define a volume 16 therebetween. The contoured surface 10 may have a predetermined contour, which is configured to impart a predetermined contour to a stamped surface of the stamped part.

The additive manufacturing process used to produce the shell 4 is not particularly limited, and may include fused deposition modeling (FDM), polymer jetting, selective laser sintering (SLS), or other additive manufacturing techniques. Various polymers may be used as the material for additively manufacturing the shell 4, and these are not particularly limited and may include various thermosets and thermoplastics. A thermoplastic material used to form the shell 4 may have a certain glass transition or deflection temperature for maintaining a desired shape of the shell 4 and contoured surface 10 when contacting the shell 4 with liquid backfill material, e.g. molten backfill material. A thermoplastic material used to form the shell 4 may have a certain thermal degradation temperature for maintaining a desired shape of the shell 4 and contoured surface 10 when contacting the shell 4 with liquid backfill material. The shell 4 can be formed by 3D printing a polymer material, or by other additive manufacturing techniques. The polymer material may be built up, layer-by-layer, to form a solid phase 3D object as the shell 4. The polymer material may be in liquid form, and then coalesced into a layer by hardening/curing. Each subsequent layer is then formed and built up upon a preceding layer, and hardened/cured to form the shell 4. The polymer material may include a thermoset material, or a thermoplastic material.

To increase the rigidity and strength of the tool 2, and for accommodating forces acting on the contoured surface 10 and shell 4 as a whole during a pressing operation (e.g. die stamping process), the AM shell 4 is backfilled with a backfill material that is different from the polymer used the make the AM shell 4. This different material may be used in order to form a support structure 18 at the second side 8 of the shell 4. The backfill material may be a liquid phase or a solid phase, e.g. granular in nature, a solid structure, or a hollow structure, and thus define the support structure 18. The support structure 18 may offer rigidity and strength to the shell 4 to allow the shell 4 to be able to withstand the compressive loads of the forming process, either through the nature of the liquid phase, or solid phase, e.g. a granular medium, or a solid or hollow structure.

A liquid or granular backfill material may allow the backfill material to flow at the second side 8 of the shell 4 to fill the volume 16. However, such flowability of the backfill material may result in bulging or other unwanted deformation under loading as the backfill material is pressurized by external forces during pressing operations. In order to accommodate for this, the volume 16 may be closed in order to prevent the liquid or granular backfill material from escaping the tool 2, and this may thus offer strength and rigidity to the tool 2. In this aspect, sand or water could be used as the backfill material.

In a non-limiting embodiment, a solidifying liquid backfill material (e.g. a slurry or molten backfill material) may be used to produce a solid phase backfill material as the support structure 18. The solid phase backfill material that defines the support structure 18, may be a solid structure or have one or more voids in its mass, e.g. it may be hollow. The solid phase backfill material itself, and/or the support structure 18 as a whole, may thus have a strength and rigidity greater than the AM shell 4. The liquid backfill material may optionally solidify through an input to the backfill material, or by the passage of time. For example, the liquid backfill material may solidify to form a solid phase backfill material by a change in temperature (e.g. cooling), the application of radiation, by a chemical reaction, or by drying. The use of a solid phase backfill material as the support structure 18 may obviate closing off the volume 16, which might otherwise be necessary when a liquid or flowable backfill material is used. Options for the solidifying backfill materials may include cement or epoxy. However, these solidifying materials may be expensive and can only be used once, eliminating the cost benefit of using reusable material for the support structure 18. Thus, the support structure 18 for the shell 4 may be formed from a reusable solidifying backfill material.

The reusable solidifying backfill material may include a low melting temperature material including a metal, a fusible alloy, or an element (e.g. Gallium). The backfill material (e.g. fusible alloy or other metal) may be in a molten state (e.g. by melting with the application of heat) and in this molten backfill material may be arranged at the second side 8 of the AM shell 4. The molten backfill material is then allowed to solidify (e.g. by cooling) to provide a highly rigid solid phase support structure 18 at the second side 8 of the AM shell 4. The AM shell 4 may have sufficient durability to heat in order to inhibit deformation during application of the molten backfill material. This durability may be accomplished by making the AM shell 4 out of a polymer with a sufficiently high glass transition temperature or a sufficiently high thermal degradation temperature. The polymer used to make the AM shell 4 may be filled with carbon fiber, carbon black, boron nitride, graphene or other material to increase thermal conductivity to increase heat transfer, thus hastening both solidification and re-melting of the backfill material. These characteristics of the polymer material may be balanced along with considerations of having a sufficient thickness to the shell 4, but while also attempting to minimize the amount of polymer used in order to reduce the material costs and use time of the AM machine.

Examples of low melting point metals that can be used in the molten backfill material include various fusible alloys and low melting point elements. In one embodiment, the fusible alloy is Field's metal (an alloy of bismuth, tin, and indium) or other low melt point alloys that are highly thermally conductive. A low melting point element, such as gallium, may be used having a melting point below 30° C. and a conductivity of around 40.6 W/m·K. Other exemplary low melting point metals or alloys that can be used as the backfill material can include alloys containing mercury, gallium, bismuth, lead, tin, cadmium, zinc, indium, thallium, and/or only alkali metals, as well as pure elements including gallium, bismuth, indium, and tin. Suitable fusible alloys for the backfill material may include Woods metal, Rose metal, Galinstan, and NaK. A low melting point metal or alloy used in the backfill material may have melt temperatures falling in the range of about 47° C. to about 60° C., for example. The backfill material can be selected to have a thermal conductivity that is similar to, or greater than tool steel, which has a thermal conductivity of around 27 W/m·K.

The solid phase backfill material may be reusable, even when the contoured surface 10 is worn from a term of use in a pressing machine. As such, after the forming tool 2 is no longer adequate, or even no longer needed, to form stamped parts, the solid phase backfill material may be removed from the forming tool 2 by being separated from the shell 4. This may be accomplished by melting the solid phase backfill material. The molten backfill material may then be reused in another tool 2 as a support structure 18 for another AM shell 4. This reuse of the backfill material allows the cost of the backfill material to be spread out over more than one forming tool 2.

By using low melting point metals as the backfill material to form the support structure 18, the rigidity and strength of the forming tool 2 is greatly increased as compared to a forming tool with backfill materials including other solidifying materials such as epoxy and urethane. This is because low melting point metals, such as fusible alloys, may have elastic moduli much greater than polymer backfill candidates such as epoxy or urethane. The backfill material may have a strength and rigidity greater than the polymer used to make the shell. While low melting point metals used as the backfill material may initially be more expensive than the polymer or cement alternative, the low melting point metals can be re-melted and used in subsequent tools, amortizing their cost over multiple uses in different tools. A low melting point metal may be chosen over a typical metal or metal alloy (e.g. steel or aluminum alloys) because the melting temperature is sufficiently low to avoid melting, burning or other thermal decomposition, or heat-induced deflection of the AM polymer shell 4. Further, using a low melting point metal to form the support structure 18 may decrease the time of production as compared to a process where the entire tool 2 is formed by additive manufacturing, rather than just the shell 4.

The support structure 18 may be in contact with the second side of the shell 4. However, this is not required, and one or more interlayers (e.g. adhesives, insulation layers, etc.) may be arranged between the shell 4 and the support structure 18. As seen, the backfill material conforms to the contours of the second side 8 to form a support structure 18 that fully support the entire second side 8 of the AM shell 4 against forces from a pressing operation.

When a solid phase backfill material is used as the support structure 18, the solid phase backfill material may be mechanically connected to the second side 8 of the polymer shell 4 to inhibit separation of the solid phase backfill material from the polymer shell 4. The solid phase backfill material may also be connected to the second side 8 of the polymer shell 4 by friction between the two, or by adhesion between the two such as by using an adhesive arranged between the backfill material and the polymer shell 4.

The polymer shell 4 may include an integrally formed structure at the second side 8. The mechanical connection between the support structure 18 and the AM polymer shell 4 may be accomplished by molten backfill material entering in or around the integrally formed structure and being solidified therein or there around, so as to interlock the shell 4 and solid phase backfill material together, and thus maintain the relative positions of the solid phase backfill material and the shell 4.

Figure 2:
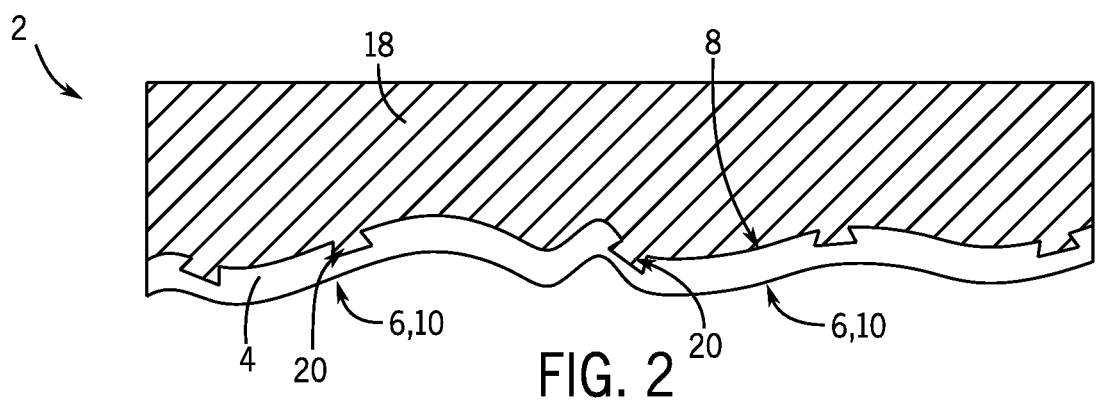
FIG. 2 is a cross-sectional view of another forming tool according to the present subject matter.

The integrally formed structure is included at the second side 8 of the polymer shell 4, and may be in the form of undercut depressions 20 (FIGS. 2, 5, and 7) extending into the second side 8 of the shell 4. These undercut depressions may be arranged in the base 12 or sidewalls 14 of the shell 4. The integrally formed structure may also be in the form of one or more walls 22 with apertures 24, extending from the second side 8 of the polymer shell 4. The integrally formed structure may also be in the form of one or more tapered projections 66 extending from the second side 8 of the polymer shell 4. The integrally formed structure is not limited to these arrangements, and can include other features to connect the solid phase backfill material to the shell 4.

The undercut depressions 20 may be in the form of a "dovetail", including an opening at the second side 8 that is open toward the volume 16, and which is smaller than a base of the undercut depression 20. With this dovetail configuration, the molten backfill material may enter into the undercut depressions 20, solidify, and thus may be held in place therein, and may thereby mechanically connect the solid phase backfill material (i.e. the support structure 18) with the AM shell 4. If it is desired to separate the solid phase backfill material from the shell 4, the solid phase backfill material may be re-melted so that it can be removed from the undercut depressions 20. The AM shell 4 may include more or less undercut depressions 20, differently shaped and sized undercut depressions 20, and include differently arranged undercut depressions 20 as that shown in the figures.

Figure 3:
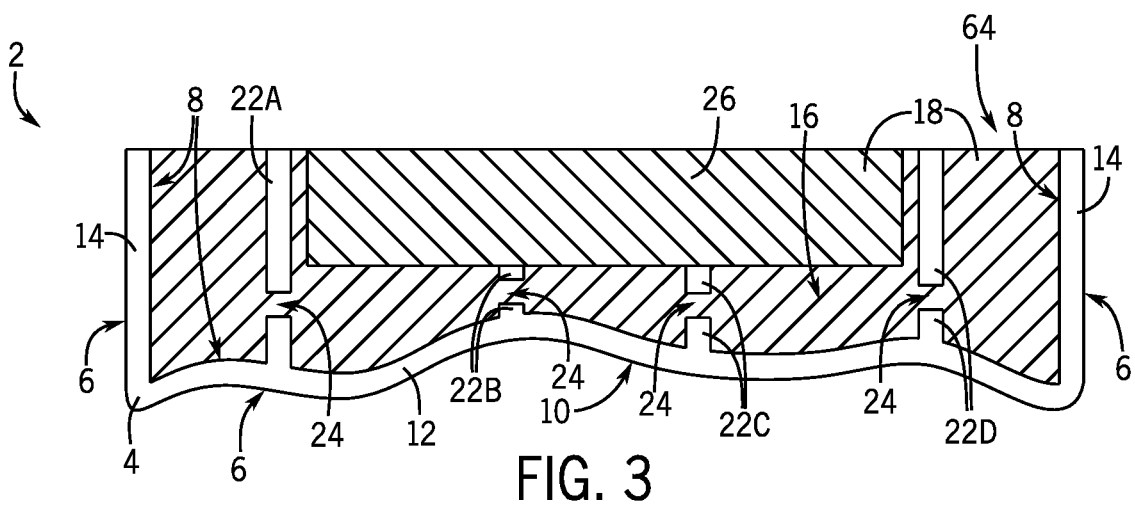
FIG. 3 is a cross-sectional view of another forming tool according to the present subject matter.

As depicted in FIGS. 1 and 3, the integral structure may include a plurality of walls 22. Each wall 22 may include one or more apertures 24 extending through each wall 22. As seen in FIGS. 1 and 3, the shell 4 includes four walls 22A-22D that are integrally formed with the rest of the shell 4, i.e. with the base 12 and sidewalls 14, optionally using the same polymer material as that used to form the rest of the shell 4. The apertures 24 extend through each wall 22 from one side to the other side of each wall 22. The solid phase backfill material is arranged on both sides of each wall 22, and is continuous through the apertures 24, thereby mechanically connecting the solid phase backfill material, i.e. the support structure 18, to the second side 8 of the shell 4. More or fewer walls 22 may be included and these may be differently arranged than that depicted in the figures. The walls 22 may be regularly arranged as shown in FIGS. 1 and 3 for example, may be labyrinthine to create a continuous channel in the volume 16 in which molten backfill material may be injected, may have a honeycomb structure, or may have other arrangements.

The apertures 24 may be arranged along a height of the walls 22 to facilitate filling the volume 16 with the molten backfill material, where the apertures 24 allow the molten backfill material to be poured into the volume 16 at any location, flow through them, and thus flow to and fill all parts of the volume 16. The walls 22 may provide support, rigidity, and strength to the shell 4 before the support structure 18 is added thereto, including during the additive manufacturing process.

Figure 7:
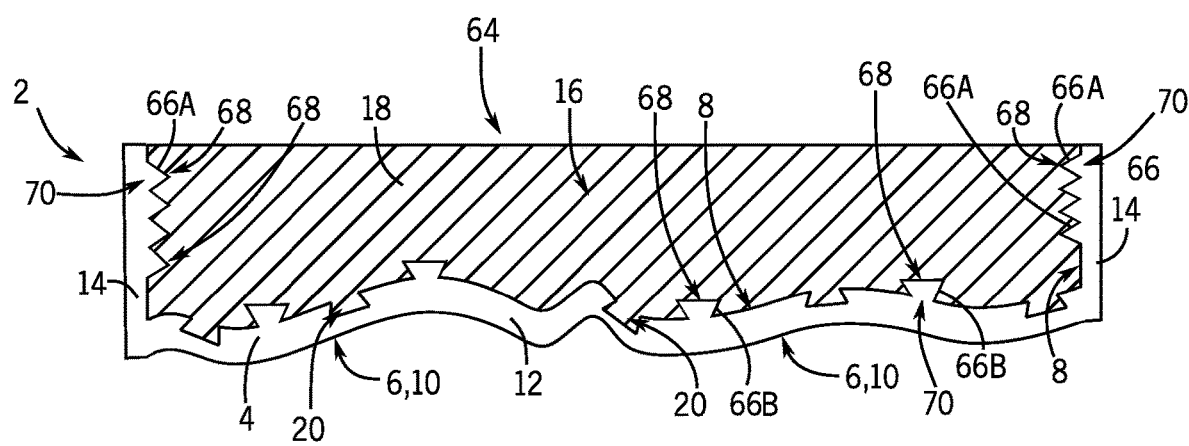
FIG. 7 is a cross-sectional view of another forming tool according to the present subject matter.

As depicted in FIG. 7, the integral structure may include a plurality of tapered projections 66 projecting from the second side 8 of the shell 4 and into the volume 16. Each of the tapered projections 66 includes a tip 68 and a base 70. The projections are integrally formed with the shell 4, and extend from the second side 8 and into the volume 16 such that the base 70 is closer to the second side 8 of the polymer shell 4 than the tip 68. As seen, the shell 4 may include one or more of a first type of tapered projection 66A that tapers down towards the tip 68, e.g. the tip 68 is smaller than the base 70. The shell 4 may include one or more of a second type of tapered projection 66B that tapers down towards the base 70, e.g. the tip 68 that is larger than the base 70. Although the shell 4 in FIG. 7 is shown to include the first type of tapered projections 66A, the second type of tapered projections 66B, and the undercut depressions 20, it should be understood that the shell 4 could include only one, only two, or all three of these integral structures, or none of these as desired, or may include one or more of these in combination with the walls 22 of FIGS. 1 and 3.

Figure 5:
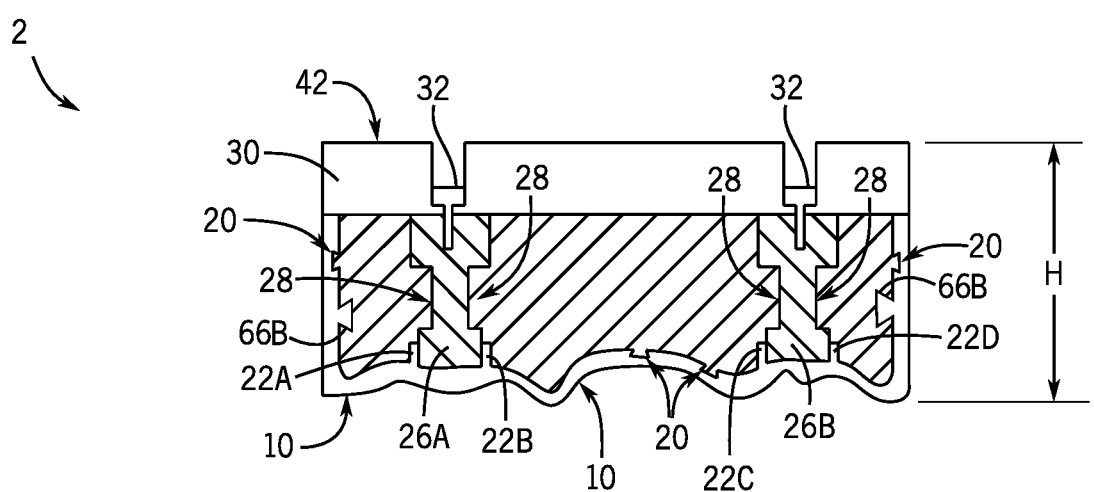
FIG. 5 is a cross-sectional view of another forming tool according to the present subject matter.

The first type of tapered projections 68A, which tapers down towards the tip 68, may be arranged on a sidewall 14 of the polymer shell 4 (FIG. 7). Here, the solid phase backfill material may be arranged around the tapered projection 68A to thereby mechanically connect the solid phase backfill material to the second side 8 of the polymer shell 4. The second type of tapered projections 68B, which taper down towards the base 12, may be arranged on the base 12 (FIG. 7) of the polymer shell 4 and/or on the sidewalls 14 (FIG. 5). Here, the solid phase backfill material may be arranged around the tapered projection 68B to thereby mechanically connect the solid phase backfill material to the second side 8 of the polymer shell 4.

The integral structure used to mechanically connect the solid phase backfill material, i.e. the support structure 18, to the AM shell 4 is not limited to that shown in the figures, and the AM shell 4 may include other integral structures.

The tool 2 may further include a piece 26 of solid phase filler material (also referred to herein as filler material) as part of the support structure 18. The piece 26 occupies a certain volume, and thus may be used to take up some of the volume 16 that is to be filled by the solid phase backfill material. In other words, the solid phase backfill material may not fill the entire volume 16, and some of the volume 16 may be taken up by the piece 26 of filler material. This can reduce the amount of backfill material that may be needed in order to make the tool 2. The piece 26 may be a solid mass, or may include one or more internal voids (e.g. may be hollow). The outermost surface of the piece 26 may be continuous, and thus prevent the backfill material from entering into the space occupied by the piece 26, thus reducing the amount of backfill material necessary to fill the volume 16.

The filler material may have a certain thermal conductivity so as to be used as a heat sink to quickly absorb and dissipate heat from the molten backfill material, and thus speed up solidification of the molten backfill material, or speed up re-melting of the solid phase backfill material to remove it from the shell 4. The piece 26 may be arranged at the second side 8 of the shell 4 before the molten backfill material is arranged there. The piece 26 may be arranged at a predetermined location with respect to the shell 4, and the predetermined location may be determined by a plurality of walls 22. For example, FIG. 3 depicts the piece 26 being spaced from the base 12 by walls 22B and 22C, and spaced from the sidewalls 14 by walls 22A and 22D.

The tool 2 may include two or more pieces 26 of solid phase filler material. As depicted in FIG. 5, the tool 2 includes two pieces 26A, 26B of solid phase filler material. The first piece 26A is arranged at a predetermined location with respect to the shell 4 by walls 22A and 22B, and the second piece is arranged at a predetermined location with respect to the shell 4 by walls 22C and 22D.

The pieces 26 of solid phase filler material may be of any shape. FIG. 3 depicts the piece 26 to have a rectangular cross section, i.e. in the shape of a block. FIG. 5 depicts the pieces 26A and 26B to each have an I-shaped cross section, i.e. in the shape of an I-beam. Other shaped pieces 26 of filler material may be used as desired.

The pieces 26 of solid phase filler material may be secured in place simply by solidification of the backfill material (FIG. 3) to create a compression fit or friction fit, or by mechanical interaction with the solid phase backfill material (FIG. 5). As depicted in FIG. 5, the pieces 26A and 26B each include two recesses 28, which are filled with solid phase backfill material to thereby mechanically connect the pieces 26A, 26B with the solid phase backfill material.

Removal of the piece(s) 26 from the tool 2 may require melting of the solid phase backfill material. The solid phase filler material may have a certain melting point (i.e. greater than that of the backfill material and polymer shell) so as not to melt when molten backfill material comes into contact with it. In this way, the pieces 26 of solid phase filler material may be reused in other tools 2 along with the backfill material. In an aspect, the size and shape of the piece 26 may meet certain specifications, so as to fit into different types of pressing tools having different types of AM shells, and thus is not limited to being used in only one type of AM shell or forming tool.

The solid phase filler material may have a higher density than the molten backfill material to prevent buoyant forces from floating the piece 26 out of place within the volume 16 during formation of the tool 2. Alternatively, there could be a fixture to clamp the piece 26 relative to the shell 4 to hold it in place until the molten backfill material solidifies. The solid phase filler material may include a solid metal/alloy, for example those including silver or copper, and may have a strength greater than the solid phase backfill material and polymer shell 4. This strength may provide more support to the shell 4 against forces acting on it during a pressing operation, than if the pieces 26 of solid phase filler material were not included in the tool 2.

The tool 2 may also include an adapter 30 (FIG. 5), which may be connected to the rest of the tool via connectors 32 attached to the pieces 26A, 26B on a side opposite from the polymer shell 4. The adapter 30 may be used to regulate a height H of the tool 2 so that the tool 2 can fit in and be used in a standardized configuration for a press 34. The adapter 30 may also be used to provide a standardized connecting face 42 to the tool 2, for easily connecting the tool 2 to various presses. The adapter 30 may comprise metal, plastic, composite, or other materials. The adapter 30 may be much thicker than the rest of the tool 2, in order to reduce the amount of polymer material need to make the shell 4 and backfill material need to make the support structure 18.

Figure 4:
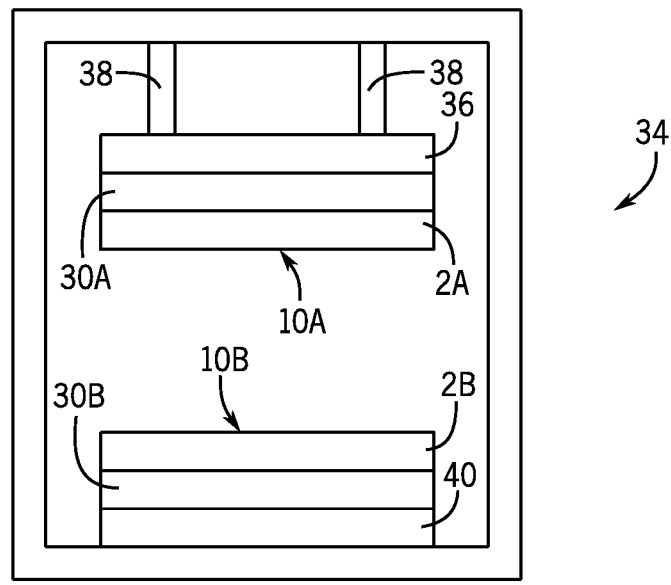
FIG. 4 is a side view of a press including a forming tool according to the present subject matter.

A press 34 may utilize one or more of the tools 2 disclosed herein. As depicted in FIG. 4 for example, the press 34 includes two tools 2A, 2B. The first tool 2A includes a contoured surface 10A facing a contoured surface 10B of the second tool 2B. The first tool 2A includes an adapter 30A, which is connected to a press slide 36 arranged on actuators 38, such as hydraulic cylinders, mechanical linkages, or servo-mechanical mechanisms, which move the press slide 36, and thus the first tool 2A, down toward the second tool 2B during a pressing operation. The second tool 2*b* includes a second adapter 30B, which is connected to a press cushion 40 arranged at the bottom of the press 34. A material (e.g. sheet metal) may be placed between the tools 2A, 2B and be stamped by the press 34 to form a stamped component. To form the stamped component, the first tool 2A may be moved to come into contact with the material so as to impart a stamped surface that has a contour according to the predetermined contour of the contoured surface 10A. The stamped surface may have a desired contour opposite from the predetermined contour. The second tool 2B may similarly impart a stamped surface to the material. The tool 2 may be used in other types of presses.

Figure 6:
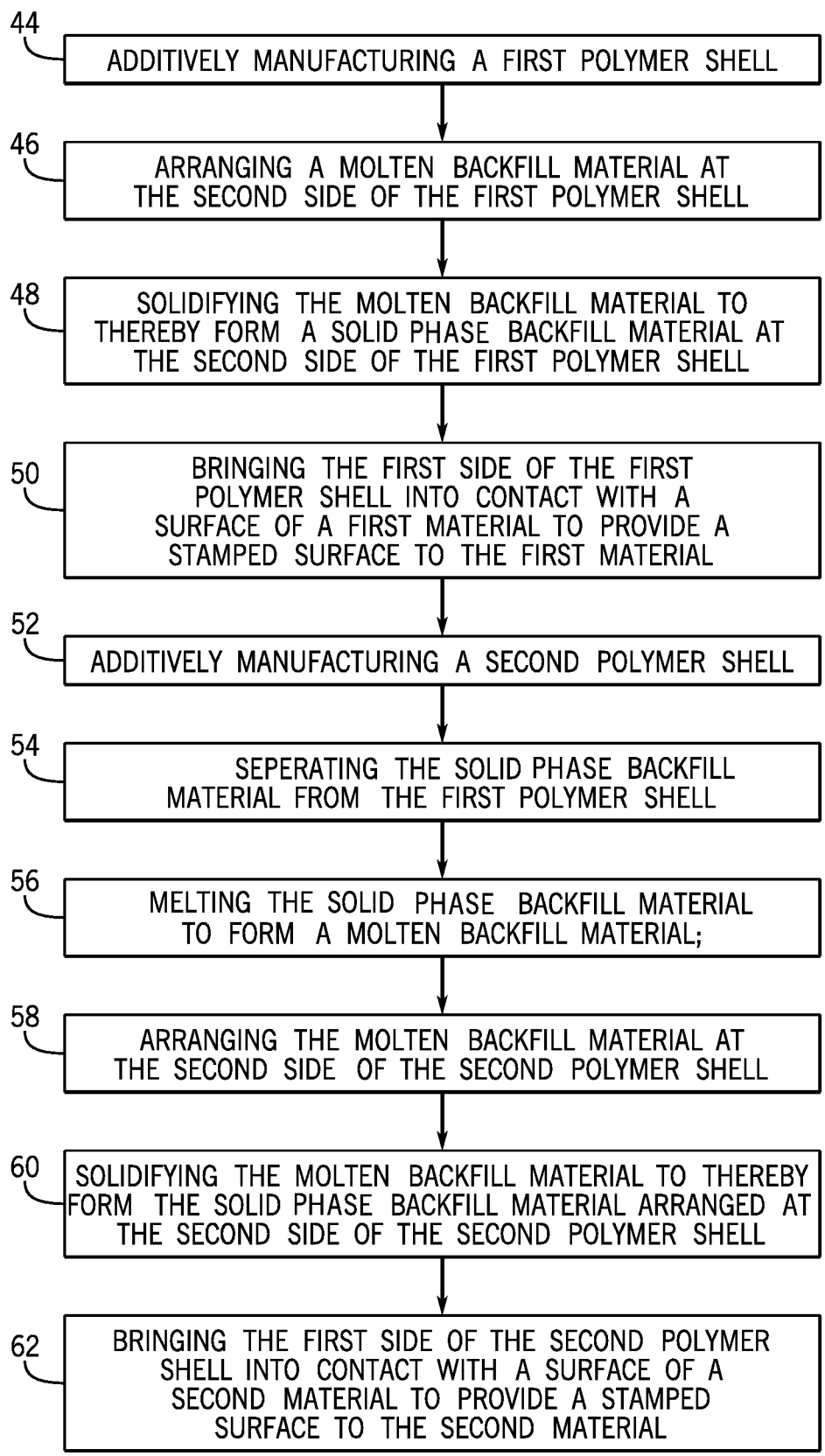
FIG. 6 is a schematic block diagram illustrating a method according to the present subject matter.

A method of stamping (FIG. 6) may include a method of making the forming tool 2, along with a method of forming stamped components.

The method of making the forming tool 2 may include at 44, additively manufacturing the shell 4 defining the first side 6 and the second side 8 opposite from the first side 6. The first side 6 of the shell 4 includes the contoured surface 10, which is configured with to contact a material to form the stamped components. Additively manufacturing the shell 4 may include forming an integrally formed structure (e.g. undercut depressions 20, walls 22 and apertures 24, tapered projections 66) at the second side 8 of the shell 4 also by additive manufacturing At 46, the molten backfill material is arranged at the second side 8 of the polymer shell 4. The molten backfill material may be in contact with the second side 8 of the shell 4, or may be separated therefrom by one or more other layers, such as an insulation layer or adhesive layer. Where the shell 4 includes the base 12 and sidewalls 14 (FIG. 1, 3, 5), the molten backfill material may be simply poured over the second side 8 of the shell 4 to fill the volume 16. If the walls 22 are included, the molten backfill material may be poured at any location at the top opening 64 of the shell 4. The molten backfill material may flow to all parts of the volume 16 by flowing through the apertures 24 in the walls 22. Where the tool 2 includes the piece 26 of solid phase filler material, the piece 26 may be arranged in the volume 16 prior to, or even after, arranging the molten backfill material at the second side 8 of the shell 4. The molten backfill material may flow around the piece 26 and into any recesses 28 if included. The piece 26 may be arranged between various walls 22 so that it is at a desired location within the volume 16. Where the shell 4 does not include sidewalls (FIG. 2), the shell 4 may be inserted in a mold to contain the molten backfill material at the second side 8 until the molten backfill material solidifies. Thereafter, the tool 2 may be removed from the mold. The molten backfill material may be arranged at the second side 8 by other methods, including spraying, dipping, etc.

At 48, the molten backfill material is solidified to thereby form the solid phase backfill material at the second side 8 of the polymer shell 4. The solid phase backfill material, which is included in the support structure 18, is mechanically connected to the second side 8 of the polymer shell 4 by being solidified in contact with the integrally formed structure at the second side 8 of the shell 4. Solidification may occur by passively allowing the molten backfill material to cool, or by actively cooling the molten backfill material. Solidification mechanically connects the solid phase backfill material to the shell via contact with the integrally formed structure. Solidification may also secure the piece 26 of solid phase filler material to the solid phase backfill material. The piece 26 of solid phase filler material may have a thermal conductivity greater than the backfill material, and may thus help to dissipate heat from the molten backfill material and thus hasten solidification of the molten backfill material. The solid phase filler material may also have a modulus of elasticity greater than the polymer shell. The solid phase filler material may also have a melting point, optionally a thermal conductivity, and optionally a strength greater than that of the solid backfill material. In FIG. 3, the piece 26 may be secured in the solid phase backfill material by the solid phase backfill material contacting three sides of the piece 26 as shown. In FIG. 3, the piece 26 may be secured in the solid phase backfill material by compressive forces, friction, adhesion, or penetration of the solid phase backfill material into pores or other openings in outermost surface of the piece 26. In FIG. 5, the pieces 26 are secured in the solid phase backfill material by a mechanical connection including the solid phase backfill material being arranged in the recesses 28 of the pieces 26.

The method of making the forming tool 2 may also include mechanically connecting the adapter 30 to the rest of the forming tool. This mechanical connection may be made via connectors 32 inserted through the adapter 30 and attached to the pieces 26 of solid phase filler material, e.g. by threaded connections.

The method of forming stamped components may include, at 50, bringing the contoured surface 10 of the first side 6 of the polymer shell 4 into contact with a surface of a material to provide a stamped surface to the material, thus producing a stamped part from the material. The stamped surface may have a predetermined contour that corresponds to the predetermined contour of the contoured surface 10. This step may be repeated any number of times as desired to additional materials to produce additional stamped parts.

If the contoured surface 10 wears out from stamping, or if the tool 2 is simply no longer needed, the method of forming stamped components may additionally include reusing the support structure 18 (i.e. the backfill material and piece 26) to produce another tool with a new AM polymer shell. This may be accomplished as part of the method of forming stamped components at step 52, by additively manufacturing a second AM polymer shell including a first side and a second side opposite from the first side. The second shell may be the same, similar, or differ from the original shell (i.e. first shell) as desired.

At 54, the solid phase backfill material is separated from the first shell. This may include separating the piece 26 of solid phase filler material from the first shell and from the solid phase backfill material. This step may be facilitated by re-melting the solid phase backfill material at 56, to produce molten backfill material, which may be easily removed from the first shell. Alternatively, the solid phase backfill material may be simply physically separated from the first shell and then may be subsequently melted at 56 in a separate process.

At 56, the solid phase backfill material may be melted by the application of heat. If the piece 26 of solid phase filler material is included in the original tool (i.e. first tool), this piece 26 may help melt the solid phase backfill material by the filler material having a relatively high thermal conductivity. The filler material may have a greater thermal conductivity than the backfill material, and thus may speed up the transfer of the applied heat to the backfill material to melt it.

At 58, the molten backfill material is arranged at the second side of the second shell. This may be accomplished in the same way as for the first shell, such as by pouring, for example. If desired, this step may include positioning the piece 26 of solid phase filler material at the second side of the second shell, either before or after arranging the molten backfill material there.

At 60, the molten backfill material is solidified to thereby again form the solid phase backfill material arranged at the second side of the second shell, thereby creating a support structure for the second tool. The second tool may also include an adapter 30 similarly to the first tool.

At 62, the contoured surface of the first side of the second shell of the second tool, is brought into contact with a material to provide a stamped surface to the second material to thereby produce a second stamped part.

The method of stamping may be performed using a forming machine, e.g. the press 34 machine, a stamping machine, etc., by attaching the first and second tools to the press 34.

A method of stamping may be performed by providing a press having a forming tool. The forming tool may include an additive manufactured polymer shell defining a first side and a second side opposite from the first side. The first side includes a contoured surface having first predetermined contour. The tool includes a support structure including a solid phase backfill material arranged at the second side of the polymer shell. The method includes bringing the first side of the polymer shell into contact with a surface of a material to provide a stamped surface to the material. The stamped surface has a second predetermined contour corresponding to the first predetermined contour. In the method, the forming tool may be a first forming tool, and the polymer shell may be a first polymer shell. The method may further include additively manufacturing a second polymer shell including a first side and a second side opposite from the first side; separating the solid phase backfill material from the first polymer shell; melting the solid phase backfill material to form a molten backfill material; arranging the molten backfill material at the second side of the second polymer shell; and solidifying the molten backfill material to thereby form the solid phase backfill material arranged at the second side of the second polymer shell. In the method, the first forming tool may include a piece of filler material arranged in the solid phase backfill material. The piece of filler material may be arranged in the solid phase backfill material, which is arranged at the second side of the second polymer shell. The solid phase backfill material may be mechanically connected to the second side of the polymer shell. The method may further include separating the piece of filler material from the solid phase backfill material, and arranging the piece of filler material in the molten backfill material at the second side of the second polymer shell.

A method of making a forming tool can include forming a polymer shell by additive manufacturing. The polymer shell may define a first side and a second side opposite from the first side. The first side of the polymer shell may be configured to contact a material to form a stamped part. The method may further include forming a support structure for the polymer shell, and arranging the support structure at the second side of the polymer shell. In the method, the polymer shell and the support structure may both be formed before the support structure is arranged at the second side of the polymer shell. The support structure may be formed by the backfill material being cast in a mold, machined, printed, or by other forming processes. The solid phase backfill material may also be included in more than one piece, such as several pieces of solid phase backfill material being arranged in the volume 16. These several pieces can be adhesively bonded together and/or to the shell 4. The support structure may be formed around the solid phase filler material. The step of arranging the support structure at the second side of the polymer shell may then include adhesively bonding the support structure to the second side of the polymer shell. In the method, the polymer shell may be formed before the support structure is arranged at the second side of the polymer shell. The steps of forming the support structure for the polymer shell and arranging the support structure at the second side of the polymer shell may then be performed by arranging a molten backfill material at the second side of the polymer shell, and solidifying the molten backfill material to thereby form a solid phase backfill material as the support structure. In the method, the support structure may be formed before the support structure is arranged at the second side of the polymer shell. The support structure may be formed by the backfill material being cast in a mold, machined, printed, or by other forming processes. The support structure may be formed around the solid phase filler material. The steps of forming the polymer shell and arranging the support structure at the second side of the polymer shell may then be performed by additive manufacturing the polymer shell directly on the support structure.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A stamping tool configured to be connected to a press, and pressed by the press against a material to thereby form a stamped component from the material, the stamping tool comprising: an additive manufactured polymer shell defining a first side and a second side opposite from the first side, the first side including a contoured surface configured to produce a stamped surface in the material when pressed by the press against the material; and a solid phase backfill material arranged at the second side of the polymer shell
wherein: the polymer shell includes an integrally formed structure at the second side of the polymer shell; the solid phase backfill material has a strength and a rigidity greater than the polymer shell; the solid phase backfill material contacts the structure to thereby mechanically connect the solid phase backfill material to the second side of the polymer shell;
wherein: the structure includes a plurality of walls each including a plurality of apertures; and the solid phase backfill material is arranged at two sides of each wall and is continuous through the plurality of apertures to thereby mechanically connect the solid phase backfill material to the second side of the polymer shell.

2. The stamping tool according to claim 1, wherein:
the structure includes a plurality of undercut depressions; and
the solid phase backfill material is arranged in the plurality of undercut depressions to thereby mechanically connect the solid phase backfill material to the second side of the polymer shell.

3. The stamping tool according to claim 1, wherein:
the structure includes a plurality of tapered projections extending from the second side of the polymer shell into the solid phase backfill material, each of the projections having a tip and a base, the base being closer to the second side of the polymer shell than the tip;
each projection tapers down a) toward the tip or b) toward the base;
if a) the projection tapers down toward the tip, then the tapered projection is arranged on a side wall of the polymer shell and the solid phase backfill material is arranged around the tapered projection to thereby mechanically connect the solid phase backfill material to the second side of the polymer shell;
if b) the projection tapers down toward the base, then the solid phase backfill material is arranged around the tapered projection to thereby mechanically connect the solid phase backfill material to the second side of the polymer shell.

4. The stamping tool according to claim 1, wherein:
the tool further comprises a piece of filler material arranged in the solid phase backfill material;
the filler material has a melting point, a thermal conductivity, a modulus of elasticity, and a strength greater than that of a polymer of the polymer shell; and
the melting point of the filler material is greater than that of the solid phase backfill material.

5. The stamping tool according to claim 4, wherein the piece of filler material is arranged at a predetermined location with respect to the polymer shell, and the predetermined location is determined by the plurality of walls.

6. The stamping tool according to claim 4, wherein the piece of filler material includes a recess, and the recess is filled with the solid phase backfill material to thereby mechanically connect the piece of filler material to the solid phase backfill material.

7. The stamping tool according to claim 1, further including an adapter arranged on a side of the stamping tool opposite from the polymer shell, wherein the adapter is configured to connect the stamping tool to the press.

8. The stamping tool according to claim 7, wherein the adapter is larger in height than a combined height of the polymer shell and the solid phase backfill material.

9. The stamping tool according to claim 7, wherein:
the tool further comprises a piece of filler material arranged in the solid phase backfill material; and
the adapter is connected to the tool via connectors attached to the piece of filler material.

10. The stamping tool according to claim 9, wherein:
the piece of filler material includes a recess; and
the piece of filler material is mechanically connected to the solid phase backfill material by the solid phase backfill material filling the recess.

11. The stamping tool according to claim 9, wherein the piece of filler material is arranged at a predetermined location with respect to the polymer shell by being arranged between two walls of the plurality of walls.

12. The stamping tool according to claim 5, wherein the plurality of walls determine the predetermined location of the piece of filler material with respect to the polymer shell by spacing the piece of filler material from the polymer shell.

13. A press configured to produce a stamped surface in a material, the press including the stamping tool according to claim 1, and an actuator connected to the stamping tool and configured to press the stamping tool against the material to produce the stamped surface in the material.

14. The press according to claim 13, further including an adapter connecting the stamping tool to the actuator.

15. A method of stamping, comprising:
providing a press including the stamping tool according to claim 1; and
operating the press to press the stamping tool against a material to thereby stamp a surface of the material.

16. The method of claim 15, wherein the stamping tool is a first stamping tool and the material is a first material, the method further comprising:
a) removing the first stamping tool from the press;
b) separating the solid phase backfill material from the polymer shell;
c) melting the solid phase backfill material to produce a molten backfill material;
d) arranging the molten backfill material at a second side of a second polymer shell;
e) solidifying the molted backfill material at the second side of the second polymer shell to form a second stamping tool;
f) attaching the second stamping tool to the press; and
g) operating the press to press the second stamping tool against a second material to thereby stamp a surface of the second material.

17. The method of claim 16, wherein the first stamping tool includes a piece of filler material arranged in the solid phase backfill material, the method further comprising:
before step d), separating the piece of filler material from the solid phase backfill material; and
arranging the piece of filler material in the molten backfill material at the second side of the second polymer shell.

* * * * *